US012585818B1

(12) United States Patent
Kumar et al.

(10) Patent No.: US 12,585,818 B1
(45) Date of Patent: Mar. 24, 2026

(54) SYSTEM AND METHOD FOR PROTECTION OF PERSONALLY IDENTIFIABLE INFORMATION

(71) Applicant: UIPCO, LLC, San Antonio, TX (US)

(72) Inventors: Surender Kumar, Palatine, IL (US); Jess W. Gingrich, San Antonio, TX (US); Olga Kirik, Monument, CO (US)

(73) Assignee: United Services Automobile Association (USAA), San Antonio, TX (US)

( * ) Notice: Subject to any disclaimer, the term of this patent is extended or adjusted under 35 U.S.C. 154(b) by 281 days.

(21) Appl. No.: 18/307,216

(22) Filed: Apr. 26, 2023

Related U.S. Application Data

(60) Provisional application No. 63/363,747, filed on Apr. 28, 2022.

(51) Int. Cl.
G06F 21/62 (2013.01)

(52) U.S. Cl.
CPC .............................. G06F 21/6245 (2013.01)

(58) Field of Classification Search
CPC ...... G06F 21/60; G06F 21/62; G06F 21/6218; G06F 21/6245
See application file for complete search history.

(56) References Cited

U.S. PATENT DOCUMENTS

| | | | | |
|---|---|---|---|---|
| 10,789,385 B1 * | 9/2020 | Jayapalan | ............... | G06F 16/48 |
| 11,748,510 B1 * | 9/2023 | Beveridge | ........... | G06F 21/6245 |
| | | | | 726/27 |
| 11,803,661 B1 * | 10/2023 | Sutherland | ............ | G06F 40/169 |
| 2016/0267227 A1 * | 9/2016 | Takeyama | ............... | G16Z 99/00 |
| 2017/0154207 A1 * | 6/2017 | Sasaki | ................. | G06F 21/6245 |
| 2020/0151360 A1 * | 5/2020 | Zavesky | ............. | G06F 21/6218 |
| 2021/0150358 A1 * | 5/2021 | Lansel | .................. | G06F 18/217 |

* cited by examiner

*Primary Examiner* — D'Arcy Winston Straub

(74) *Attorney, Agent, or Firm* — Plumsea Law Group, LLC

(57) ABSTRACT

A method and system of automatically protecting sensitive information. The system identifies whether sensitive information is being provided in a file by a user at an application. The application will block the submission of documents that include sensitive information or are of low quality. If sensitive information is identified, the application will perform an automated redaction of the selected portions of the file in order to remove the sensitive information before submission to a remote electronic repository.

20 Claims, 11 Drawing Sheets

1000

RECEIVING A FIRST FILE INCLUDING ELECTRONIC CONTENT — 1010

DETECTING A FIRST SENSITIVE DATA IN A FIRST PORTION OF THE ELECTRONIC CONTENT — 1020

REDACTING THE FIRST PORTION, THEREBY EFFECTIVELY OBFUSCATING OR REMOVING THE FIRST SENSITIVE DATA AND PRODUCING A MODIFIED FIRST FILE — 1030

VERIFYING THAT THE MODIFIED FIRST FILE IS FREE OF SENSITIVE DATA — 1040

ELECTRONICALLY SUBMITTING THE MODIFIED FIRST FILE TO A REMOTE COMPUTING SYSTEM — 1050

SYSTEM AND METHOD FOR PROTECTION OF PERSONALLY IDENTIFIABLE INFORMATION

CROSS-REFERENCE TO RELATED APPLICATION

This application claims the benefit of U.S. Provisional Patent Application Ser. No. 63/363,747 filed on Apr. 28, 2022 and titled "System and Method for Protection of Personally Identifiable Information", the disclosure of which is incorporated by reference herein in its entirety.

TECHNICAL FIELD

The embodiments relate generally to methods and systems for modifying presentation of information in a file, and specifically to adjusting the content of a document to remove presentation of private data during a file submission process.

BACKGROUND

A key consideration during use of a communication network is its ability to ensure privacy, safety, and security to the client using it. As communication technology has evolved, so too has the sophistication of criminals and hackers intending to inflict mischief, disrupt systems, steal money, and accidentally or maliciously harm others. Credit card fraud, stolen passwords, identity theft, location tracking, and the unauthorized publicizing of confidential information, private pictures, files, emails, text messages, and private tweets are but a few examples of modern cybercrime. Although there have been various sophisticated methods developed by electronic content providers to protect the user's online and offline computing experiences, users have not been provided with a mechanism by which to reliably hide their personal information when providing documents over a network.

There is a need in the art for a system and method that addresses the shortcomings discussed above.

SUMMARY

In one aspect, a method of protecting sensitive information. The method includes a first step of receiving, at a document submission application, a first file including electronic content, and a second step of detecting, at the document submission application, a first sensitive data in a first portion of the electronic content. In addition, the method includes a third step of automatically redacting (in response to detecting), at the document submission application, the first portion, thereby effectively obfuscating or removing the first sensitive data and producing a modified first file, as well as a fourth step of verifying, at the document submission application, that the modified first file is (now) free of sensitive data. Furthermore, the method includes a fifth step of electronically submitting, via the document submission application and in response to the verification, the modified first file to a remote computing system (e.g., over a network to a cloud-based repository).

In another aspect, a method of protecting sensitive information in video data includes a first step of receiving, at a document submission application, a first video file including a sequence of frames, a second step of detecting, at the document submission application, a first sensitive data in a first frame of the first video file, a third step of automatically redacting, at the document submission application, the first sensitive data, thereby effectively obfuscating or removing the first sensitive data from the first video file, and a fourth step of electronically submitting, via the document submission application, the redacted first video file to a remote computing system.

In another aspect, a system is disclosed for protecting sensitive information. The system comprises a processor and machine-readable media including instructions which, when executed by the processor, cause the processor to receive, at a document submission application, a first file including electronic content, and to detect, at the document submission application, a first sensitive data in a first portion of the electronic content. The instructions further cause the processor to automatically redact, at the document submission application, the first portion, thereby effectively obfuscating or removing the first sensitive data and producing a modified first file, and to verify, at the document submission application, that the modified first file is free of sensitive data. In addition, the instructions cause the processor to electronically submit, via the document submission application and in response to the verification, the modified first file to a remote computing system.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Figure 1A:
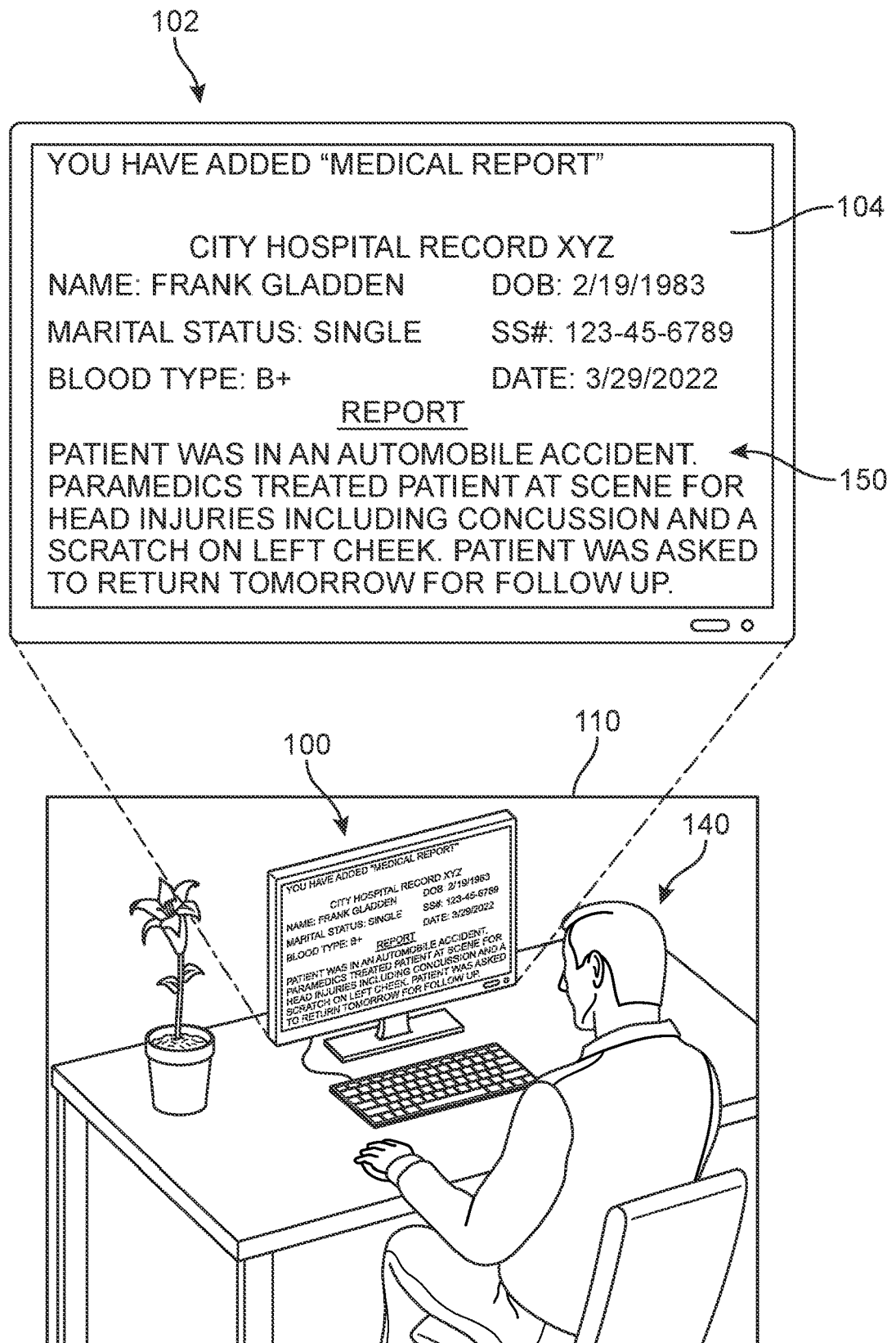
FIGS. 1A and 1B depict an example of a scenario in which a first user provides a document to an application and the application automatically removes sensitive content, according to an embodiment.

The embodiments provide a system and method for dynamically removing or blocking private information in media such as documents, photos, videos, and other information. The proposed systems and methods can thereby provide an application interaction experience aligned with a service provider or user's security preferences without requiring manual intervention or input. In one example, the system monitors information being submitted to an application ("app") to detect the presence of potentially personally identifiable information (PII) or other private data, collectively referred to as sensitive data. In cases where the presence of such data is detected, the system can automatically apply a protective response that obfuscates or removes the data prior to permitting the document to be uploaded. In other words, the proposed system would provide an option whereby the computing device is capable of implementing a protective response mechanism (also referred to herein as a "protective response" or a "protective mechanism") for electronic content if the presence of sensitive data is detected.

In a more specific example, the protective response may be implemented during an insurance claim submission process, where insured members might be required to submit images, videos or other documents or provide details related to their claims to a service provider. In such cases, by law or internal policy, there are typically privacy requirements that need to be met for personnel to rely on such files in their estimating process. Some non-limiting examples of such restrictions include ensuring no minors are visible in the images/videos, and that no PII is present. As another example, the resolution of the file content being submitted might not be adequate to make decision. Conventionally, the onus has been on the submitting party to agree and verify that the submitted documents comply with the requirements. However, there remain lapses, as the member might not carefully read the consent document(s) or requirements before acknowledging, or simply disregard such policies. In these cases, the uploaded files cannot be used by the service provider and must be rejected and deleted. The member is then requested to resubmit the documents, which generally represents an undesirable claim submission experience, while increasing both cost and claim processing time.

As will be described in greater detail below, the proposed embodiments are configured to perform an automated verification of content that is designated for submission by an end-user. The system employs computer vision and artificial intelligence (AI) and machine learning (ML) techniques to detect objects within image data and/or values in documents that are deemed to include sensitive data. Thus, in different embodiments, the system will implement an automatic validation check as part of the submission process. In one embodiment, the system will provide feedback to the user before the document is accepted indicating that such data has been detected. In some embodiments, the system will reject the file if sensitive data according to the service provider's policy is detected. In another example, the app will request that the user confirm that, despite the system's identification of such data, the file should be submitted as-is.

Alternatively, the system can automatically redact or otherwise obscure the data that has been deemed personal. For example, in some cases, edge computing may be used. In these embodiments, the submitter's computing device may use an application that includes a sensitive data removal tool. The removal tool can operate in real-time to obscure sensitive data as the image or video is being produced by the member, or once the content is provided to the application. In some embodiments, video frames that include sensitive data (for example, a child running through the frame) may be automatically deleted by the tool, and adjacent frames of the video merged or stitched to fill the video gap. In some other examples, the system can create a push background that obscures or blurs the video, but for the user. Thus, when the member is filming a 'selfie' style video, the system can push a solid color background to remove all background objects. In one embodiment, only during selected times when the app has determined that no sensitive data is present, the system can revert the presentation such that the background is restored, allowing the member to continue to capture and submit film with background objects or other exterior features.

Thus, the system can automatically cause dynamic changes in the presentation of the user's electronic content in cases where their potentially sensitive data is vulnerable to exposure over a network or would be deemed unusable by a service provider. By providing options that enhance the security of data, users may more confidently make use of the app and its services, thereby fostering increased trust. Furthermore, by protecting potentially sensitive data, the likelihood of identity theft or other losses is reduced. The present system and methods may therefore be seen as protecting individuals from a wide range of harms.

For purposes of this application, sensitive data can vary based on the policies or business rules established by the provider of the service, as well as legal requirements that may exist at the time of the submission. However, in general, sensitive data will include personally identifiable information (PII). PII should be understood to include any personal information about an individual and/or persons connected to that individual. PII can encompass data that either contains personally identifiable information, regulated data, financial information, classified data, or any data that would cause harm to an individual or an organization if it were to be compromised. Some examples of PII could include social security numbers, account numbers, habitual destinations and schedules, birthdate, musical selections, etc., a residential or home address, list of personal contacts, door codes or other entry security credentials, call logs and text messages, device, network, or application login information, selected webpages, family and friends data, such as family or friend names, addresses, communications, email addresses, voice recognition, and media including images or information about minor children. In addition, image data (photos or videos) that include representations of minors, or other features that have been identified by the service provider as unacceptable, can be classified as sensitive data.

As used herein, the term "user", "customer", and/or "member" should be understood tor refer to any end-user or person accessing an application configured with some or all of the features described herein. In addition, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" or "triggering event", refer to an event (or specific sequence of events) associated with a particular input or use of an application via an interface, which can trigger a change in the application.

Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video associated with a teaching user interface, or other such information presentation.

In addition, graphical user interfaces (GUIs) can be used to present information to a user in the form of icons, graphics, or other types of interactive elements. Such interactive elements are generally associated with a particular action or command. A user typically has to supply an input to a computing system that is associated with the interactive elements presented on the graphical user interface to execute the particular action or command. As used herein, "interactive element" broadly includes a wide variety of graphical tools or components, such as graphical icons, graphical menus, graphical buttons, hyperlinks, images, and any other element which can be displayed on a graphical display and associated with or otherwise linked to an action or process that is to be performed upon activation of an interactive element.

Referring now to FIG. 1A, for purposes of introduction, a first user 140 is shown with a first computing device ("first device") 100 seated at a desk in a first physical space 110. The first physical space 110 can refer to any physical environment such as a room in an office, residence, or other building, as well as open or outdoor spaces. In this case, the first physical space 110 is a room of a residence, such as a living room or other private space. The first user 140 is accessing a first app 104 via the first device 100. The first device 100 and other computing devices identified herein can include an electronics unit comprising a plurality of different components, such as a user interface component (e.g., a touchscreen display, keyboard, braille terminal, HMD, drawing tablet or pad, mouse, etc.), a sensor unit, a user interface module, a processor, and/or a communication module. In some embodiments, the first device 100 may also include a microphone and speaker. In this example, first device 100 is a desktop computer. In another example the first device can also be a mobile device (smart phone, mobile phone or a tablet, etc.).

Furthermore, the first device 100 may include a system including one or more processors and memory. Memory may comprise a non-transitory computer readable medium. Instructions stored within memory may be executed by the one or more processors. The first device 100 may be configured to receive and analyze data from various sensors associated with the sensor unit in the first device 100 or data that is communicated from external components or devices to first device 100. In different examples, the sensor unit includes a variety of sensors. The sensors can include one or more of an image sensor such as a camera, as well as a light sensor, a temperature sensor, an infrared sensor, a microphone, motion sensor, an air or chemical sensor, among others. In some cases, the first device 100 may also include a navigation system equipped with a GPS receiver that can receive GPS information or other receivers capable of receiving global or local positioning information.

A communication module may allow the first device 100 to communicate wirelessly. In this case, the communication module is illustrated as a wireless connection; however, wired connections may also be used. For example, the communication module may include a wired serial bus such as a universal serial bus or a parallel bus, among other connections. The communication module may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

In FIG. 1A, the first user 140 is viewing a document 150 on a monitor 102 of first device 100 through the first app 104 that he has added or identified for submission. The document 150 can include various types of content, such as text and/or images. In this case, the document 150 includes electronic content comprising a medical report ("City Hospital Record XYZ/Patient: Frank Gladden/DOB: Feb. 19, 1983/Marital Status: Single/SS #: 123-45-6789/Blood Type: B+/Date: Mar. 29, 2022/Report: Patient was in an automobile accident. Paramedics treated patient at scene for head injuries including concussion and a scratch on left cheek. Patient was asked to return tomorrow for follow up." It may be understood for purposes of this example that the portions of electronic content described include sensitive information. The first app 104 determines, based on its review of this data, that there are several strings of sensitive data. In response, the first app 104 initiates a protective response, which is illustrated in FIG. 1B.

Figure 1B:
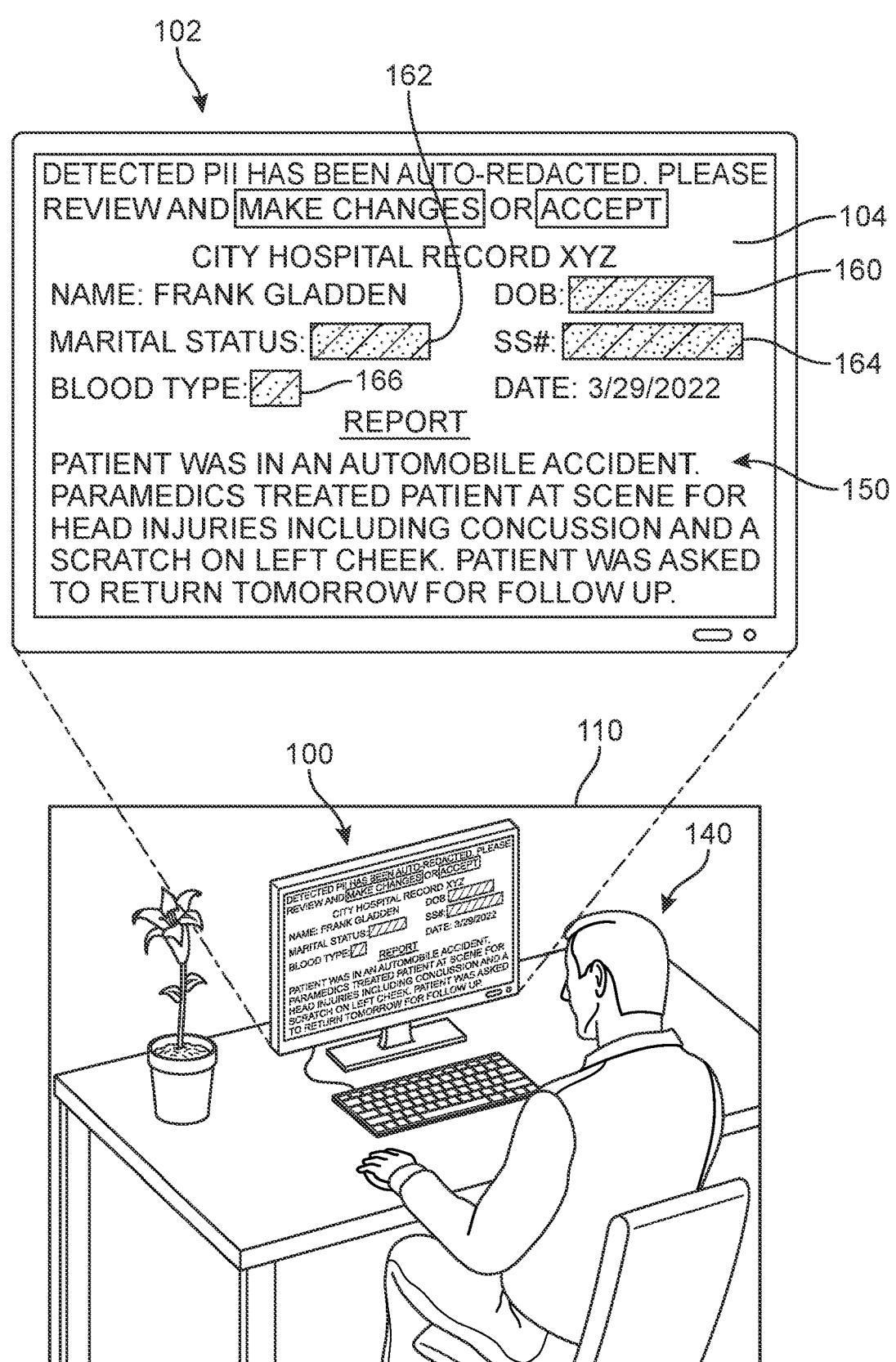

As shown in FIG. 1B, the presentation of the electronic content of document 150 has been modified. More specifically, the first app 104—having identified potentially sensitive information that was included in the document 150—secures the information. For purposes of this example, the first app 104 causes a redaction to be applied to the potentially sensitive content, shown here as a first redaction 160 (date of birth), a second redaction 162 (marital status), a third redaction 164 (Social Security number), and a fourth redaction 166 (blood type). Meanwhile, the non-sensitive content, deemed to include information that is acceptable for submission, remains normally displayed. Thus, the first user 140 is able to continue with their submission of document 150 without concern of exposure of the sensitive data in the electronic content. Furthermore, the service provider can receive and review this file without undesirable viewing of sensitive information and rely on the document for their reference without needing to reject and request a re-submission, thereby reducing the claim's turnaround time. This process can be understood to occur automatically, without any action by first user 140.

Figure 2:
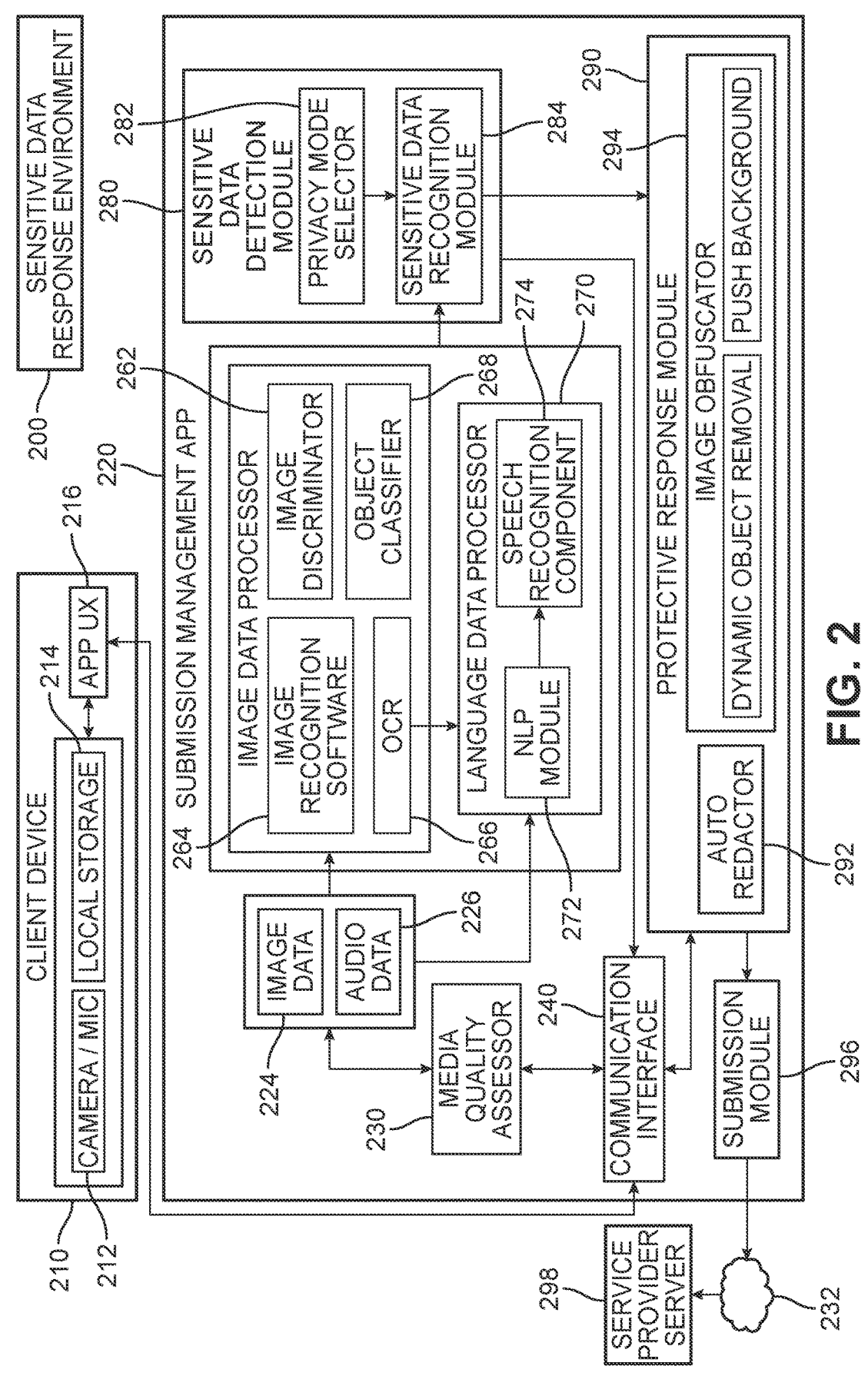
FIG. 2 is a schematic diagram of an environment for protecting sensitive information prior to submission to a service provider database, according to an embodiment.

In order to provide the reader with a greater appreciation of the embodiments, FIG. 2 depicts an overview of an embodiment of a sensitive data response environment ("environment") 200 in which the media files provided via a user's computing device are monitored and screened prior to submission via a submission management app ("app") 220. As noted earlier, the proposed embodiments may utilize techniques of edge computing to improve processing times and reduce the risk of privacy violations. As a general matter, edge computing relates to distributing processing resources and data storage closer to where the data is created to avoid the long routes to a computer system such as a cloud computing system. One or more embodiments of the present application provide a local machine learning system including a local machine learning model and profile at client device 210 in order to reduce the traffic between the client device 210 and a cloud computing system such as service provider servicer 298 (decrease latency) and to take advantage of the processing resources of the client device 210 to reduce the load of the cloud computing system. By moving a portion of the machine learning from the global machine learning system to the local machine learning system, this may reduce the traffic between the client device 210 and the cloud computing system (decrease latency) and take advantage of the processing resources of the client device 210 to reduce the load or the use of computing resources of the cloud computing system. Accordingly, the detection of sensitive data may be made through a local machine learning system at the user's local computing device instead of through the global machine learning system in the cloud computing system. The client device 210 can be a mobile computing device (smart phone, mobile phone, tablet, laptop, etc.) or a desktop computer.

In one or more embodiments, machine learning (training) may be performed in the client device 210. More specifically, a local machine learning system including a local machine learning model may be stored in a memory of the client device 210. Training data may be input to the client device 210 in different ways such as through an image capture device or a user interface. Based on the training data, the local machine learning model may learn or be trained by way of the training data, and the local machine learning model can generate or update a profile stored in the memory of the mobile computing device for sensitive data detection at the client device 210. Alternatively, training data inputted to the client device 210 may be transmitted to a cloud computing system which may be applied to one or more machine learning models for training. In another alternative, some of the inputted training data may be used to further train the local machine learning model and other inputted training data may be forwarded from the client device 210 to the cloud computing system and used for training one or more machine learning models in the cloud computing system. In another alternative, the inputted training data may be utilized for training machine learning models in both the client device 210 and the cloud computing system.

Thus, the app 220 shown in FIG. 2 is a computing system that is configured to reside in part or wholly in the user's local computing device ("client device"). The service provider will ultimately receive and transmit data, but the processing of the user's files will occur locally. It should be understood that in other embodiments, the app 220 can instead be accessed in part or entirely from a remote site (such as service provider server 298) over a network 232. In such cases, documents and other data can be uploaded to the remote submission manager system, but will remain in a pending state until examined for sensitive data. If any data is deemed sensitive, the uploaded file may be deleted and the user requested to retry their submission, or the protective response module can automatically remove sensitive data, as described herein.

As shown in FIG. 2, the environment 200 includes client computing device ("client device") 210 that is configured to host or otherwise communicate with app 220, either locally or over a network connection. Thus, in some embodiments, the various components of environment 200 can be accessed through a cloud network and/or stored on a cloud-based server. Furthermore, in different embodiments, the components of app 220 can be understood to be included in the app 220 for which an app UX 216 is being accessed, or the app 220 can be a 'plug-in' or other supplementary service that works in conjunction with a different app being accessed by the user to provide dynamic privacy functions.

In different embodiments, the client device 210 includes a visual output (display) and audio output (speaker) components that can present information and media for the application 220, as well as other output components that can be connected to client device 210. In some embodiments, app 220 can represent a product/service support software that is associated with a provider of the product/service of interest to a customer or other user. However, in other embodiments, the app can refer to any instance of software running on client device 210, including phone or other communication software, enterprise/business software, database access, etc. In some cases, the user can receive and send information through a user interface ("App UX") 216 that may be presented on the device and communicates with components of app 220 via communication interface 240. The user interface may refer to an operating system user interface or the interface of one or more software applications that may run on the client device 210, such as app 220. Furthermore, in different embodiments, the client device 210 can include or otherwise be in communication with one or more sensor devices, such as camera/mic 212 for capturing image and/or sound data. The client device 210 also includes local storage 214 from which previously created file data may be stored (e.g., images, videos, documents, and other media).

Thus, client device 210 thus can be understood to include image capture functionality and have connectivity to at least one network such as a cellular telephone network and/or the Internet for enabling ultimate submission of the file to the remote server. The camera/mic 212 that is connected to the client device 210 is configured to capture video or frame data representative of a period of time in a scene, such as an aspect of the user's environment that can include either or both of the user and background objects or visual features near the user. The video is a series of frames and associated timing information. The term video as used herein refers to both a video display (i.e., the display of streamed frames) and also to video data (i.e., the digital information which may be stored or used to produce a video display). Non-limiting examples of videos include files in MP4 or QuickTime format. The frame may be a single complete still image in a sequence of images that creates the illusion of motion within a scene when displayed in rapid succession (streamed). The frame may be used to refer to digital information representative of the single still image. The frames within a video may be associated with a brief period of time equal to 1/fps. The term 'fps' is an abbreviation for frames per second. Hereinafter, the term "still image" and "frame" may be used interchangeably. Examples of frames include files in Joint Photographic Experts Group (JPEG), Tagged Image File Format (TIFF), Graphics Interchange Format (GIF), Windows bitmap (BMP), or Portable Network Graphics (PNG) formats.

The client device 210 may further include a microprocessor, a communication unit, random access memory (RAM), non-volatile memory, a display, one or more auxiliary input/output (I/O) devices, a data port, a keyboard, a speaker, a short-range wireless communications subsystem, a rechargeable battery, a battery interface, and possibly other components. The client device 210 may include fewer, additional, or different features, which may be arranged and may operate in the manner shown or in a different manner. The client device 210 may communicate over wireless networks, including wireless telecommunication networks, wireless data networks, combined voice and data networks, or other types of wireless networks. The networks can include one or more local, regional, national, or global networks. The networks can include one or more cellular networks. In some implementations, wireless networks utilize one or more communication protocol standards, for example, 3G, 4G, GSM, CDMA, GPRS, EDGE, LTE or other.

In different embodiments, the camera/mic 212 are linked to or otherwise integrated within a unit configured to capturing images of the one or more objects in user environment, storing images of one or more objects and/or sending image data of the one or more objects for processing. The camera is further capable of capturing single or multiple images or video streams of the user environment and converting the single or multiple images or video streams to digital information (image data). The camera is equipped with optical and electro-optical imaging components for capturing images.

In different embodiments, the user of app 220 will initiate a user access session in which supporting documents are to be submitted. This can occur in real-time (e.g., a video being recorded while using the app 220 via the app UX 216, or images captured while the app UX 216 is open and requests image data, etc.), or may refer to files that have been created and are now stored on the client device 210 at local storage 214, such as PDFs, word or other text-based documents, spreadsheets, slideshows, images, videos, reports, scanned papers, among others. Each of these files will include some type of electronic content. When a user selects an item for submission, the electronic content is received by input processor 222 of the app 220, which will identify the type of file and content that has been provided.

As a general matter, the electronic content will include image data 224 and/or audio data 226. In some embodiments, once the app 220 receives the file, the app 220 will initially determine whether the image data 224 and/or audio data 226 is of a sufficient quality for further processing and eventual acceptance by the system, via a media quality assessor module 230. If the file content is corrupt or otherwise includes data determined to be of insufficient quality, a notification will be generated via app UX 216 for presentation at client device 210 alerting them to the issue(s) and requesting that a higher quality version be provided. Once the quality of the file has been verified by media quality assessor module 230, the image data 224 and/or audio data 226 will be sent to a processing module 250, comprising an image data processor 260 and a language data processor 270. In the case of image data 224, the image data processor 260 will perform several operations in order to prepare the data for subsequent evaluation by sensitive data detection module ("detector") 280.

For example, in different embodiments, image data processor 260 will perform pre-processing and processing of the image data 224. In one embodiment, the image processing algorithms perform compression, artifact correction, noise reduction, color corrections, geometric corrections, imager non-uniformity correction, etc., and various image processing enhancement operations on the image content provided by the client device 210. The image processing algorithms are numerical and symbolic algorithms for the manipulation of images and video streams captured by the camera. The algorithms can be implemented as software running on a processor, DSP processor, special purpose ASIC and/or FGPA's. The image processing algorithms can also be a mixture of custom developed algorithms and libraries. The image processing algorithms can further be arranged in any logical sequence, with potential changes in the sequence of processing or parameters governing the processing determined by image type, computational requirements or outputs from other algorithms.

In some embodiments, the image data processor 260 can apply techniques of an imager discriminator 262 in order to perform foreground-background separation. This stage includes a segmentation task, where the system splits the image into foreground and background. Furthermore, image data processor 260 may also include machine learning techniques that can be used to discriminate between features and to identify objects, for example via image recognition and object detection software ("image recognition software") 264, and/or an object classifier 268 and optical character recognition module ("OCR") 266. These modules can implement techniques that include machine vision algorithms that perform, among other operations, digit recognition, printed and handwritten text recognition, symbol, logo and watermark recognition, and general shape recognition, as well as object classification. The machine vision algorithms may reside on a different system belonging to a different entity than the image processing algorithms or the application software.

Furthermore, similar to object detection in images, object tracking will be used in videos in order to perform automated redaction. Given the initial position and size of an object, a tracking algorithm can estimate the state of the object in subsequent video frames. By maintaining a "lock" on the object of interest (person, face, license plate, etc.), the tracking algorithm helps to maintain object localization despite potential errors being committed by the object detector running on each video frame.

The machine vision algorithms, which are applied to identify an object in the digital image, may include computer vision algorithms such as image analysis algorithms that may use a feature detector or a combination of detectors. In the field of computer vision, object detection encompasses detecting the presence of and localizing objects of interest within an image. Object detection/tracking can assist the redaction problem by finding all of a certain category of object, for example faces, in a given image. The output of an object detection algorithm is typically a rectangular bounding box that encloses each object or a pixel-level segmentation of each object from its surroundings. For example, texture detectors and edge detectors known to those skilled in the art may be used. If both specific texture and specific edges are detected in a set of images, then an identification may be made. One non-limiting example of an edge detection method includes the Canny™ algorithm available in computer vision libraries such as Intel™ OpenCV. Texture detectors may use known algorithms such as texture detection algorithms provided by Matlab™. Some non-limiting examples of object detection algorithms include R-CNN, SPP, Fast R-CNN, Faster R-CNN, Feature Pyramid networks, RetinaNet (Focal loss), infoType® Detectors, Cloud-Vision®, Yolo Framework—Yolo1, Yolo2, Yolo3, and SSD. In cases where the image data includes text, the processed output can also be sent to the language data processor 270 for further review and processing.

In different embodiments, audio data 226 can also be assessed prior to submission. This can occur when video data (which is transmitted with audio content) is received, or audio-only files are provided. In such cases, the language data processor 270 can be received by a speech recognition component 274. Voice recordings can include recordings in various data formats including, but not limited to, MP3, WAV, AIFF, FLAC, OGG, and ACC files. Generally, audio is recorded using an audio codec. The processed signal is conveyed to a speech recognition component 274 which is configured to use acoustic models and language models to statistically analyze the sound recording and identify likely words based on natural language processing (NLP) module 272.

For example, the speech recognition component 274 may take the digital or analog audio signal from the file and perform speech recognition analysis to recognize one or more words spoken. Speech recognition (also referred to as automatic speech recognition (ASR), computer speech recognition or voice recognition) technology generally represents a set of technologies that allows computers equipped with a source of sound input, such as a microphone, to transform human speech into a sequence of words recorded in a computer data file. Some examples of these include the use of Hidden Markov Models (HMMs), dynamic algorithms, neural network-based models, and knowledge-based approaches. Certain systems can recognize natural human speech which has the property of words "sticking together" (or coarticulated together), also referred to as continuous speech (continuous speech recognition). Other speech recognition systems and technologies may be applicable as well. In some embodiments, the speech recognition component can make use of statistical language models (SLMs) and statistical semantic models (SSMs) that determine what a speaker means in addition to the words they said. In some embodiments, the speech recognition component 274 generates a transcription of the voice recording that can be submitted to the detector 280. Furthermore, in some embodiments, the user can participate or otherwise provide training data that can bolster the accuracy of the model used by speech recognition component 274. For example, the training data can reflect previously recognized speech patterns and corresponding sounds for an individual user.

In different embodiments, the outputted processed audio (e.g., transcribed audio) and/or image data (e.g., with object classification labels appended) will be conveyed to the detector 280. Detector 280 is responsible for determining whether the received data includes sensitive content, per the current privacy settings. It should be understood that privacy settings can be adjusted remotely by the service provider, and/or by the user (e.g., via privacy mode selector 282), and that a change made to these settings will affect what type of information will be flagged as sensitive by detector 280.

Thus, it can be appreciated that in some embodiments, the user's preferences can significantly affect the manner in which the detector 280 behaves. In other embodiments, a user may not select his/her preferences, or only make designations for some of the available settings. In such cases, default privacy settings can be used that will dictate how the detector 280 will be implemented. In some embodiments, the settings established for detector 280 by the service provider will override any user preferences in order to ensure a minimum privacy standard. In some embodiments, some or all of the default settings may be fixed by the organization associated with the app. Based on the definitions and rules for sensitive data established by the service provider, sensitive data recognition model 284 will determine whether any objects or other features in the content shared by the user includes sensitive data.

Once the model 284 detects sensitive data, or determines there is a high likelihood of the content including sensitive data, this decision will be shared with a protective response module 290 and serve as a triggering event. Depending on the type of sensitive data and the format of the content (image, document, audio), various removal techniques can be applied. In some embodiments, auto-redactor component 292 is configured to receive audio data in which segments have been tagged as sensitive, and replace those segments with white noise, or other non-verbal sound, or simply delete the segment(s). Similarly, where features in a document have been tagged as sensitive (e.g., a social security number or image of a child), the auto-redactor component 292 will apply a redaction to the tagged region of the document. As some non-limiting examples, redaction techniques can include features provided in PDFelement Pro, Nitro® Pro 10, Foxit® Phantom PDF, Adobe® Acrobat Pro DC, Expert® PDF Editor, Caseguard®, and other available redaction software.

In the case of video data, which involves dynamic aspects and objects, an image obfuscator 294 may receive static images and/or video data with supplemental data specifically identifying the sensitive features in each frame. In different embodiments, sensitive data can be removed using techniques such as blanking or masking objects such as faces with shapes in individual video frames. Other common obfuscations are blurring, pixelation, or interpolation with the surroundings. In some embodiments, geometric distortion and scrambling may be employed. For example, a bounding box of a face may be blurred, a bounding box of a may be face blanked out, or a bounding box of a face may be pixelated.

The image obfuscator 294 can engage in removal of those objects, or a replacement of the background in part or in its entirety during frames where sensitive content was flagged (push/blur/replace background). In some embodiments, the dynamic object removal will involve the stitching of segments from previous non-tagged (i.e., containing no sensitive content) frames into the tagged frames to normalize the modified content (e.g., see FIG. 9). In different embodiments, the dynamic object removal process will employ techniques such as video stitching and overlaying of frames. Thus, portions of non-sensitive content can be overlaid or used to replace the content that was flagged as sensitive. In different embodiments, once the system has determined that either (a) the file includes no sensitive data or (b) the filed included sensitive data but it has been obfuscated or removed by the protective response module 290, a submission module 296 can finalize the media for submission to the service provider server 298 over network 232.

It should be understood that in other implementations, environment 200 can include additional or fewer modules or can include one or more additional computing devices or related server devices. The modules of environment 200 can be associated with the various local computing devices and, for example, can be disposed within the computing device. In alternative implementations, the modules of environment 200 can include independent computing devices that are coupled to, and in data communication with, the local computing devices. As used in this description, the term "module" is intended to include, but is not limited to, one or more computers, processing units, or devices configured to execute one or more software programs that include program code that causes a processing device(s) or unit(s) of the computer to execute one or more functions. Processing units can include one or more processors (e.g., microprocessors or central processing units (CPUs)), graphics processing units (GPUs), application specific integrated circuits (ASICs), or a combination of different processors.

In alternative embodiments, systems and modules can each include other computing resources/devices (e.g., cloud-based servers) that provide additional processing options for performing one or more of the machine learning determinations and calculations. The processing units or devices can further include one or more memory units or memory banks. In some implementations, the processing units execute programmed instructions stored in memory to cause system, devices, and modules to perform one or more functions described herein. The memory units/banks can include one or more non-transitory machine-readable storage mediums. The non-transitory machine-readable storage medium can include solid-state memory, magnetic disk, and optical disk, a random-access memory (RAM), a read-only memory (ROM), an erasable programmable read-only memory (e.g., EPROM, EEPROM, or Flash memory), or any other tangible medium capable of storing information.

Figure 3:
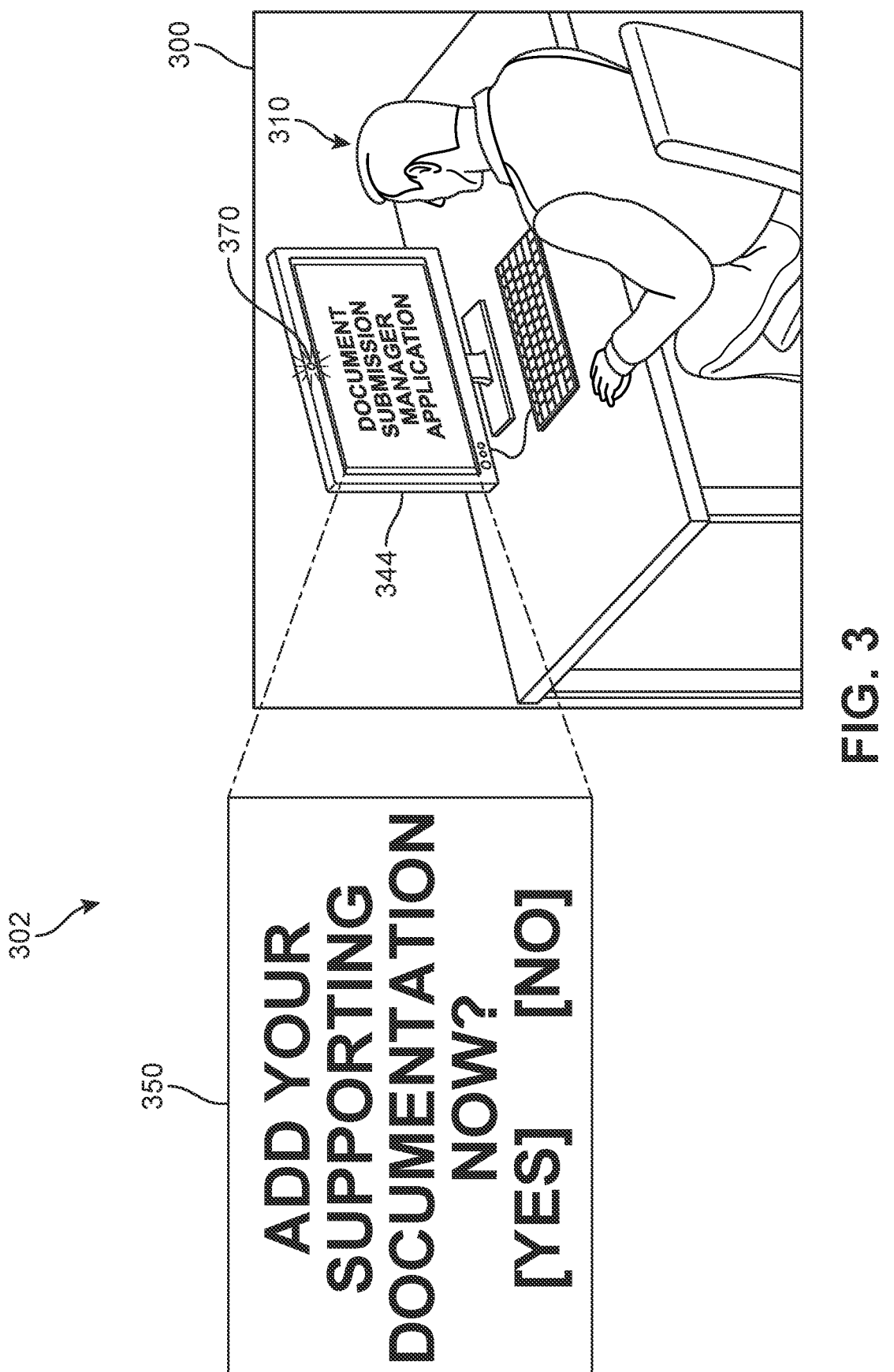
FIGS. 3-6 illustrate a sequence in which a second user is located in an office and the application automatically redacts an object in an image captured by a camera, according to an embodiment.

Referring now to FIGS. 3-6, an example of a scenario in which a dynamic privacy response system ("system") may be implemented is depicted. In this example, a second user 310 is shown seated in a public space or common room such an office space 300 at a first time 302 while using a second computing device ("second device") 344. The second device 344 includes a display which presents an interface 330 for a document submission manager application ("app") 350. In this example, the second user 310 is initiating a static image capture session ("Image capture in progress") via a camera 370 of second device 344, for example in order to offer supporting documentation for his purported injuries. In different embodiments, the app 350 may be accessed over a network connection via a remote server, or—as shown in FIG. 3—reside locally on second device 344.

Figure 4:
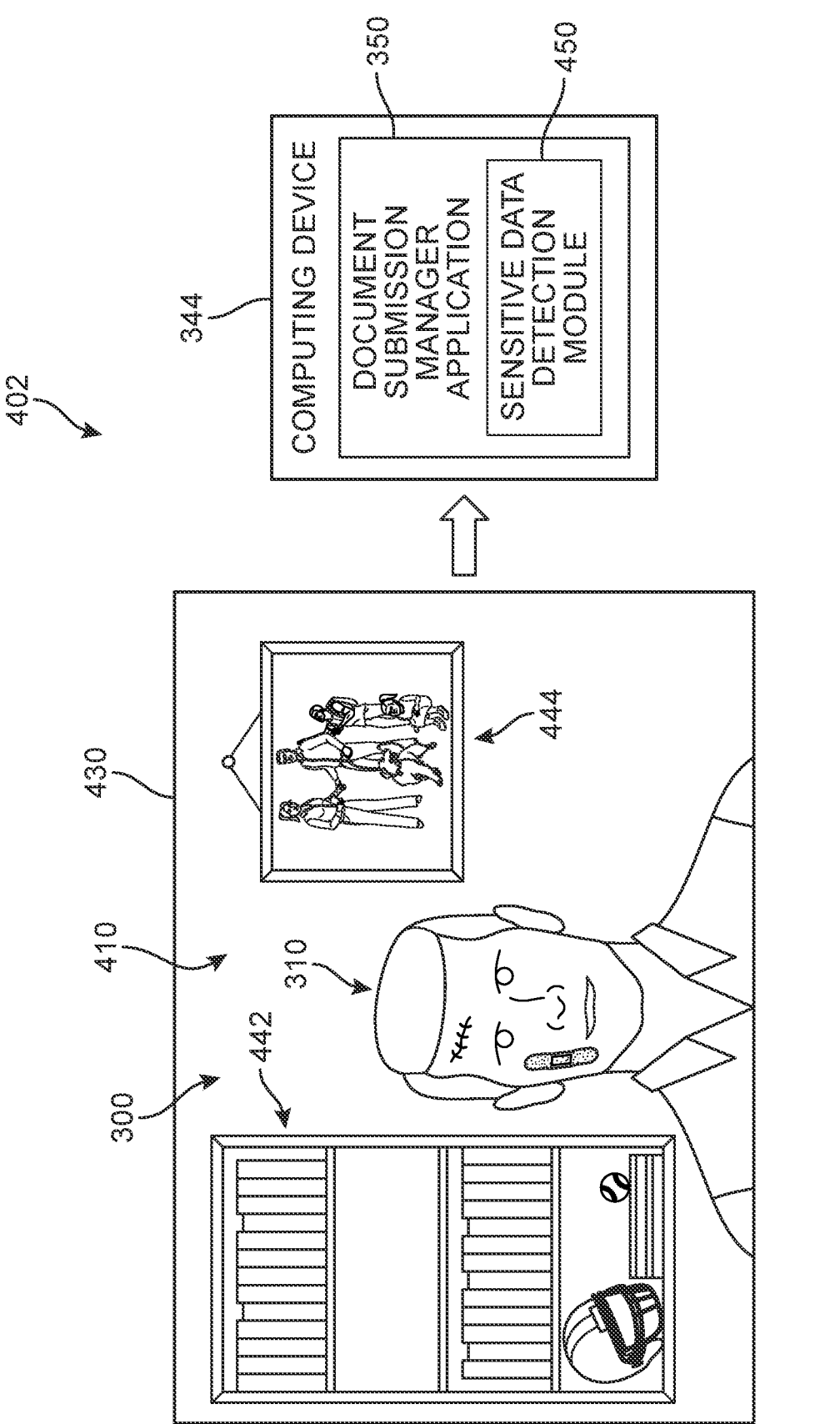

In FIG. 4, at a subsequent second time 402, the second user 310 continues to use second device 320 in office space 300, but the view is that of the camera as it captures one or more pictures (i.e., static image data 430). Second user 310 is shown in the static image data 430, as well as his background 410, which includes a bookshelf 442 and a photograph 444. The static image data 430 is received by the app 350, which evaluates the content of the image in near-real-time and determines there is a high likelihood of the presence of sensitive data in the image data via a sensitive data detection module 450. In particular, computer vision for the app 350 identifies what appears to be minor children in the photograph 444 that was also included in the static image data 430.

Figure 5:
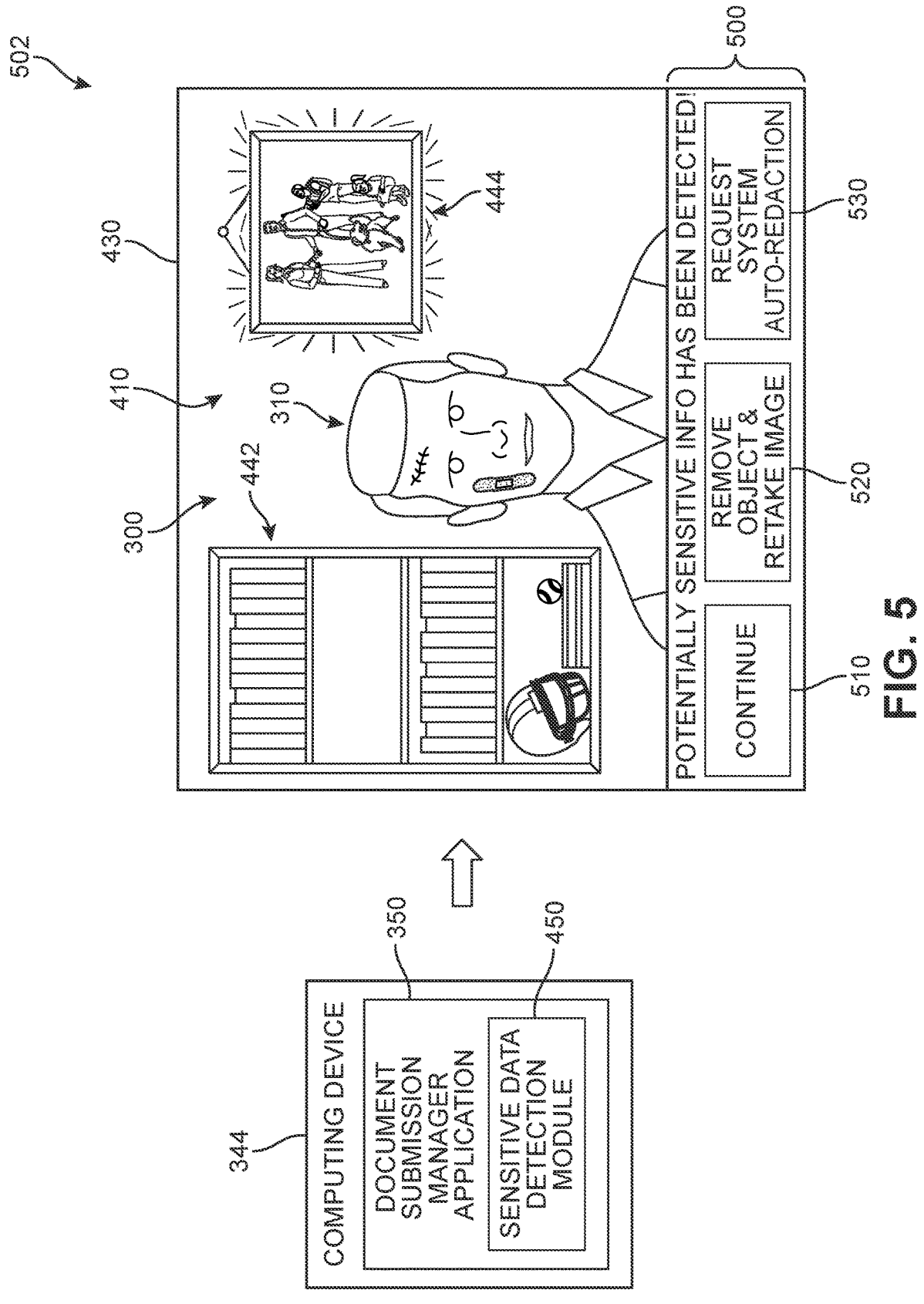

In FIG. 5, at a subsequent third time 502, the app 350 has generated and displays a notification 500 ("Potential sensitive information has been detected"). In some embodiments, the system can then offer options for the user to respond. For example, in FIG. 5, a first option 510 ("Continue") would allow the user to continue with the image capture, and ignore, override, or otherwise dismiss the system's determination. A second option 520 ("Remove object and retake image") would delete the current image data that includes the photograph 444, and allow the second user 310 to re-take the image after the photograph 444 is removed (e.g., taken off the wall, flipped over, covered by a sheet, etc.) or the camera is repositioned to avoid the specific item. A third option 530 ("Request system auto-redaction") initiates the system tool for sensitive data removal, which is illustrated in FIG. 6.

Figure 6:
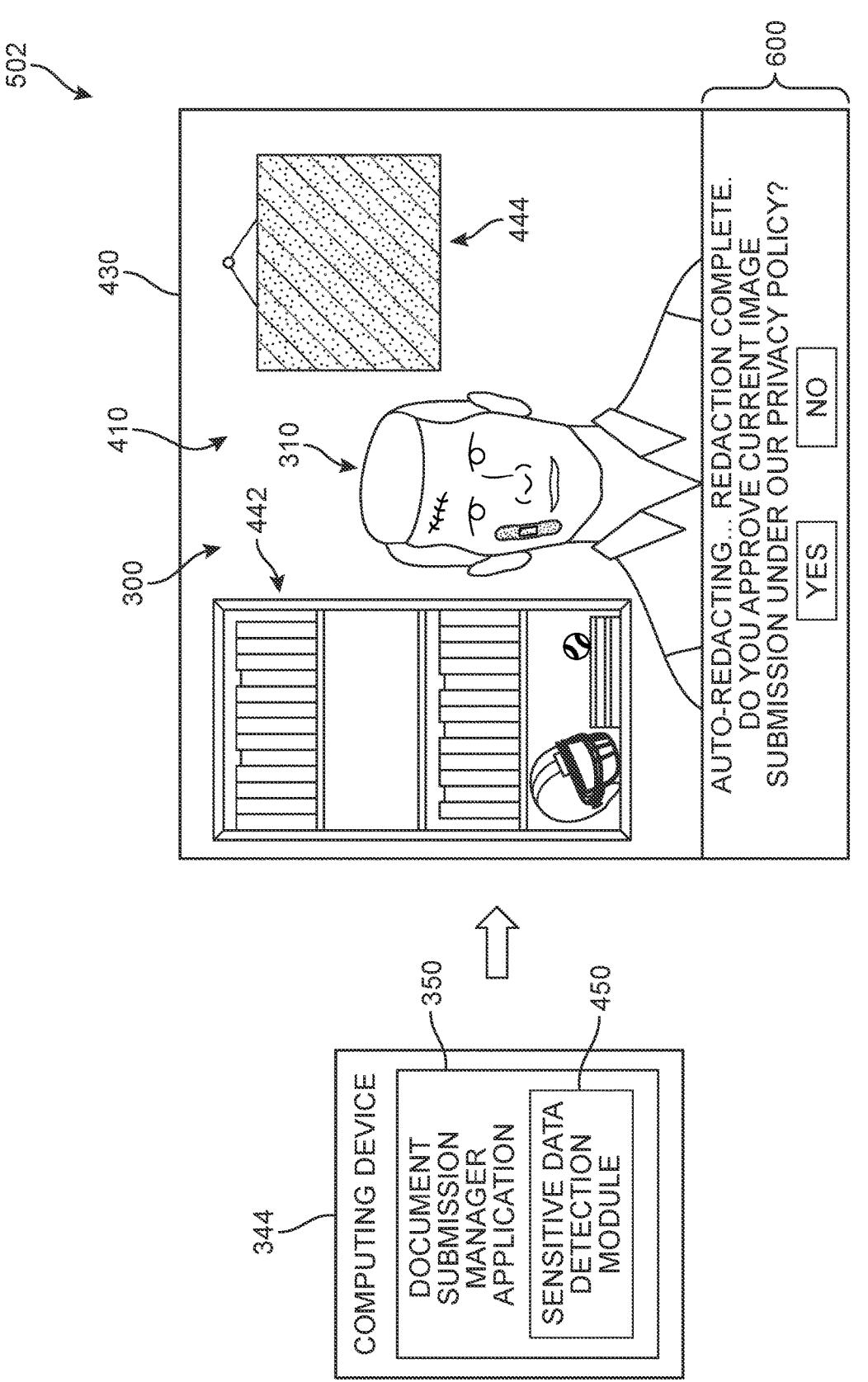

In FIG. 6, at a subsequent fourth time 602, it can be understood that the user selected the third option for system auto-redaction, and the app 350 responds accordingly. In this example, a redaction box 610 has effectively blocked or removed the appearance of the photograph 444. In other words, the photograph 444 has been concealed under a virtual panel, thereby deleting the object from the image data 430. Thus, when the image data 430 is uploaded to the remote server in support of the user's claim, it will not include the photograph 444. In some embodiments, the app 350 can present the output of its protective response, as shown in FIG. 6, where a message 600 ("Auto-redacting . . . . Redaction complete. Do you approve current image for submission under our privacy policy?"/YES/NO") is shown with selectable options for proceeding. Thus, the second user 310 can review the altered image and decide whether the image remains acceptable for submission, or if there remains some aspect of the image to be managed before submission.

Figure 7:
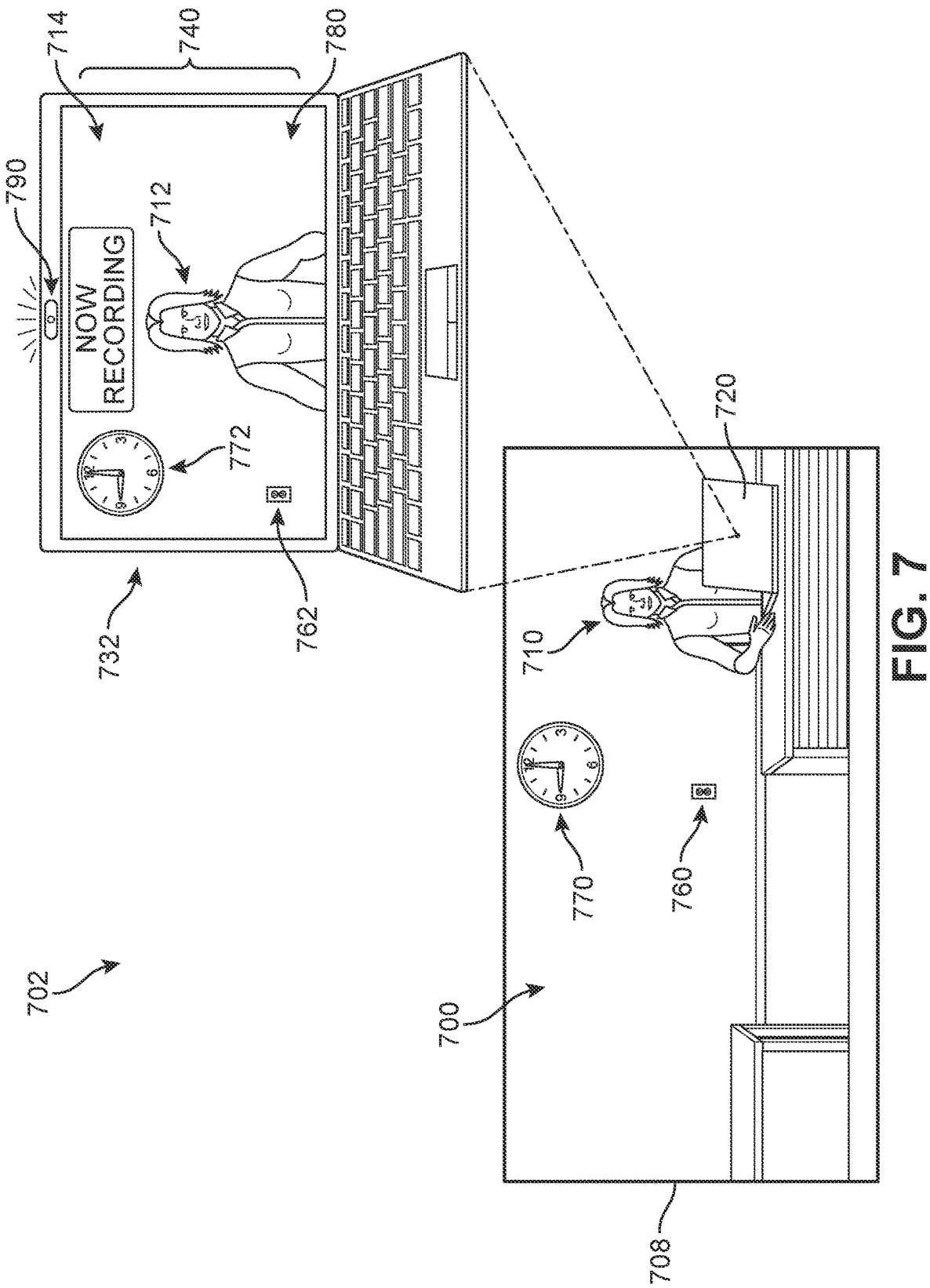
FIGS. 7-9 depict an example scenario in which a third user is located at home and the application automatically redacts a dynamic object in a video across several frames, according to an embodiment.
Figure 8:
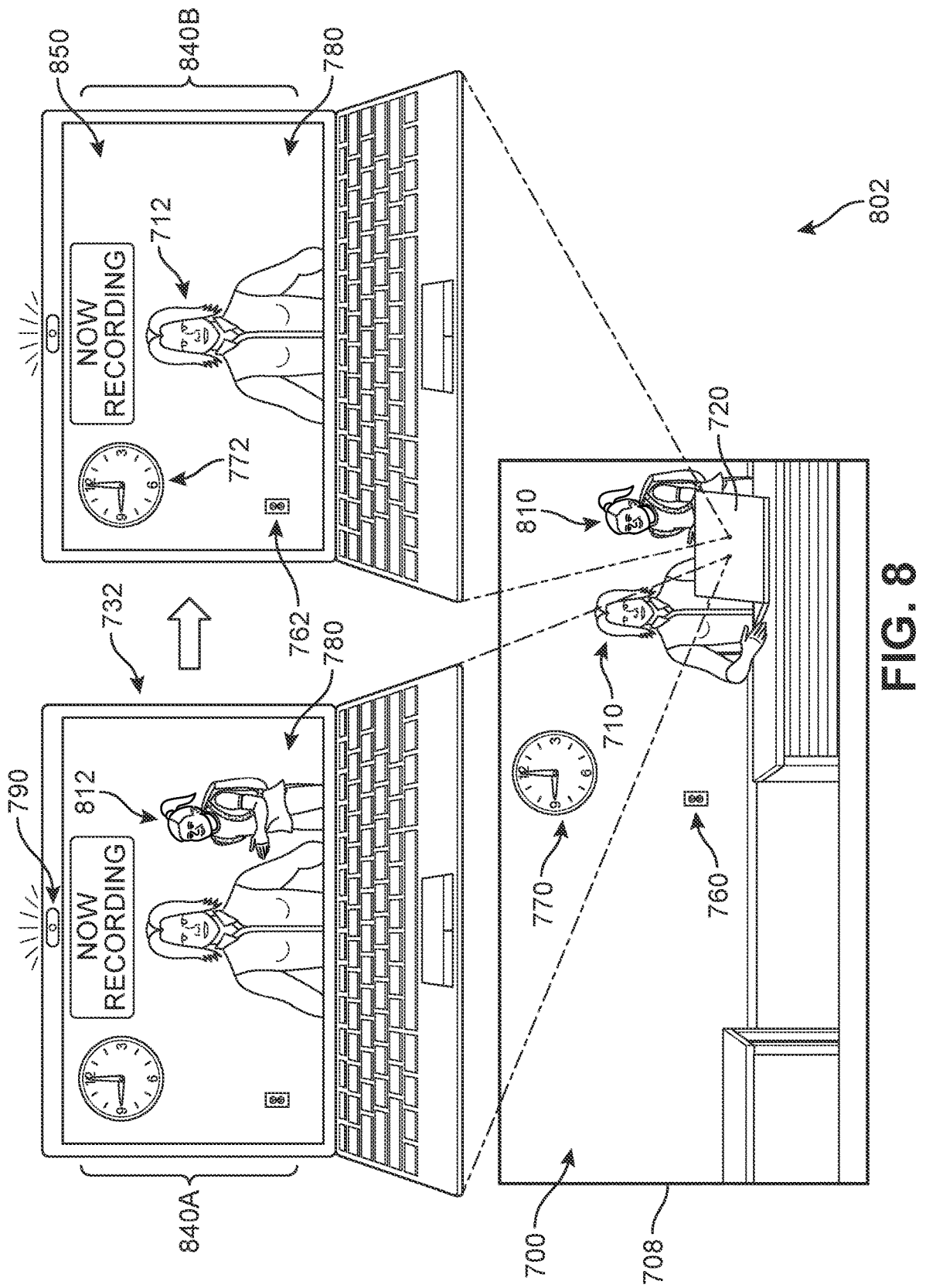
Figure 9:
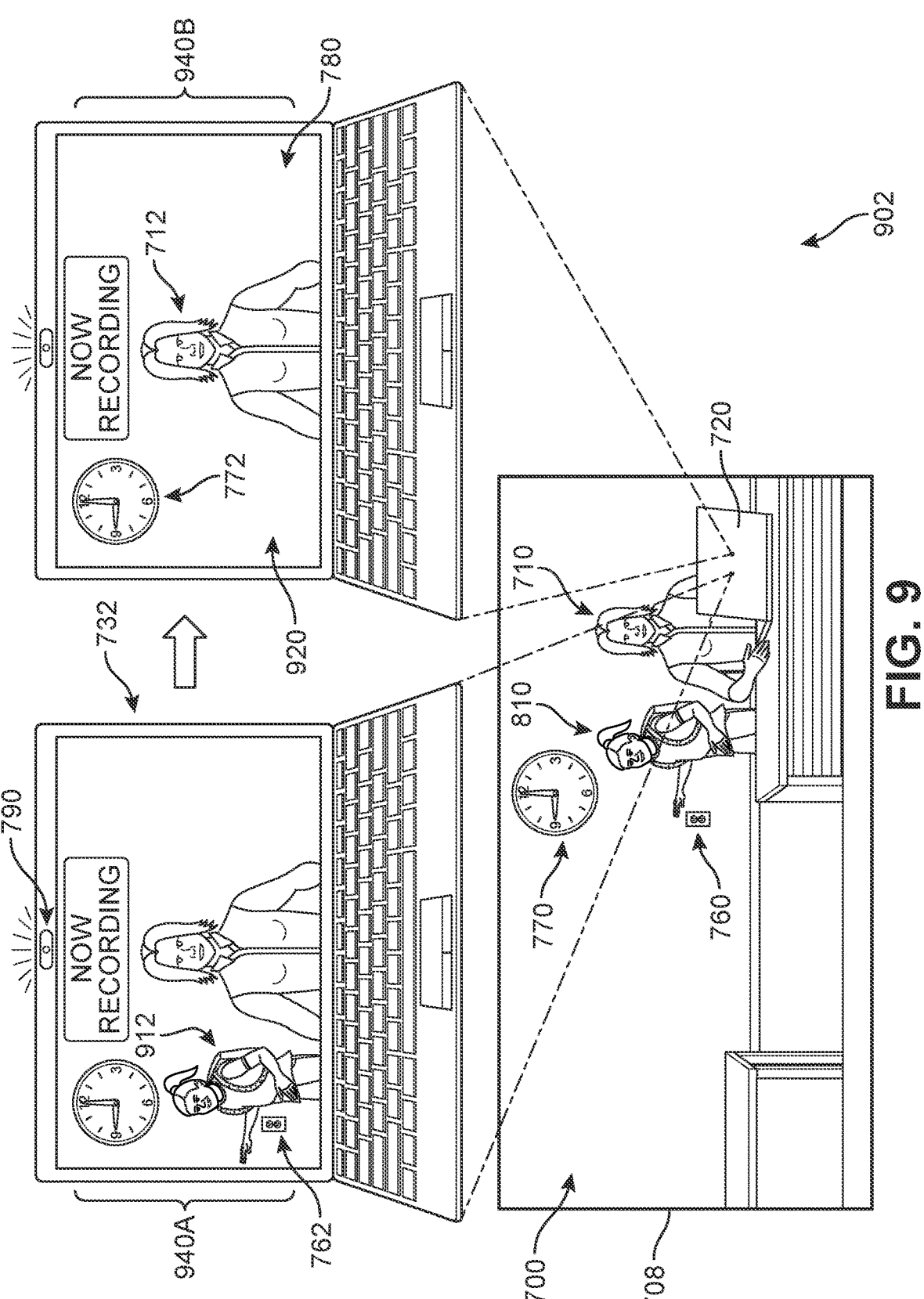

For purposes of illustration, an alternate example involving real-time video data is presented with reference to FIGS. 7-9. In FIG. 7, a third user 710 is shown seated in front of a third computing device ("third device") 720 at a first time 702 in her home 708. In a background 700 of the third user 710 is a clock 770 hanging on wall 782 and an electrical outlet (plug) 760 lower on the same wall 782. Otherwise, the background 700 is generally clear of objects. The third user 710 is facing her computing device display 732 which is shown in a magnified view above. The display 732 is presenting an interface 714 for a document submission manager application ("app") 780. In this example, the third user 710 has initiated a video capture session ("Now recording") via a camera 790 of third device 720, for example in order to offer an oral deposition for her claim. In different embodiments, the app 780 may be accessed over a network connection via a remote server, or—as shown in FIG. 7—reside locally on third device 720. As the video is recorded, a corresponding real-time first image frame 740 is shown on the display 732. In this case, a first image 712 of the third user 710 is included, as well as a second image 772 of clock 770, and a third image 762 of outlet 760.

In FIG. 8, at a subsequent second time 802, video recording is continuing. However, at this time, a child 812 enters home 708 and moves into the scene being captured by the camera, as shown in a second image frame 840A, where a fourth image 812 of the child appears to the right of the third user 710. The app 780 immediately detects the presence of a minor child in the second image frame 840A, and initiates a protective response whereby the image is reconstructed or otherwise modified. This is shown as a third image frame 840B, where the background has been 'stitched' by insertion of data from adjacent frames. In other words, there is a portion that is overlaid by an adjacent frame. Thus, the background where the fourth image 812 had been is now converted to a wall space 850, and other image objects such as first image 712 of the third user 710, second image 772 of clock 770, and third image 762 of outlet 760, which are spaced apart from the child, are maintained.

As noted earlier, it can be appreciated that during the capture of video data there will be motion. The systems described herein are configured to accommodate the change in pose of an object in order to ensure the privacy policy is not breached. An example of this process is depicted in FIG. 9, where the child 812 has walked behind the third user 710 and is now to her left, at a subsequent third time 902. The child 810 is now closer to the clock 770 and is directly adjacent to outlet 760 and partially obstructs its view to camera 790. A fourth image frame 940A which is the 'original' image includes each of these elements.

In some embodiments, as part of the protective response, the entire leftward region of the screen (including the second image 772 of clock 770 and third image 762 of outlet 760) can be removed by the app 780 at this time. However, in some cases, the app 780 can instead determine that a smaller region can be redacted or modified while preserving the privacy policy. This is shown in a fifth image frame 940B, where the background has been 'stitched' by insertion of data from adjacent frames in the lower left area where the child was positioned using video stitching techniques. Thus, the background where a fifth image 912 of the child, and third image 762 of the outlet had been is now converted to a wall space 920, and other image objects such as first image 712 of the third user 710 and second image 772 of clock 770 which are spaced apart from the child, are maintained. Thus, the appearance of the child does not interrupt the recording session, and the video that is captured can be submitted without breach of the privacy guidelines. In other embodiments, frames in the video in which the sensitive data appears can be removed entirely and replaced by the stitching/repeating of adjacent frames that were free from/did not include the sensitive data into the frames that were rejected. In some embodiments, the tagged frame(s) are removed, and the remaining frames are stitched together and frame rate slowed to compensate for the loss of frames, while retaining the corresponding audio (which did not include sensitive data).

Figure 10:
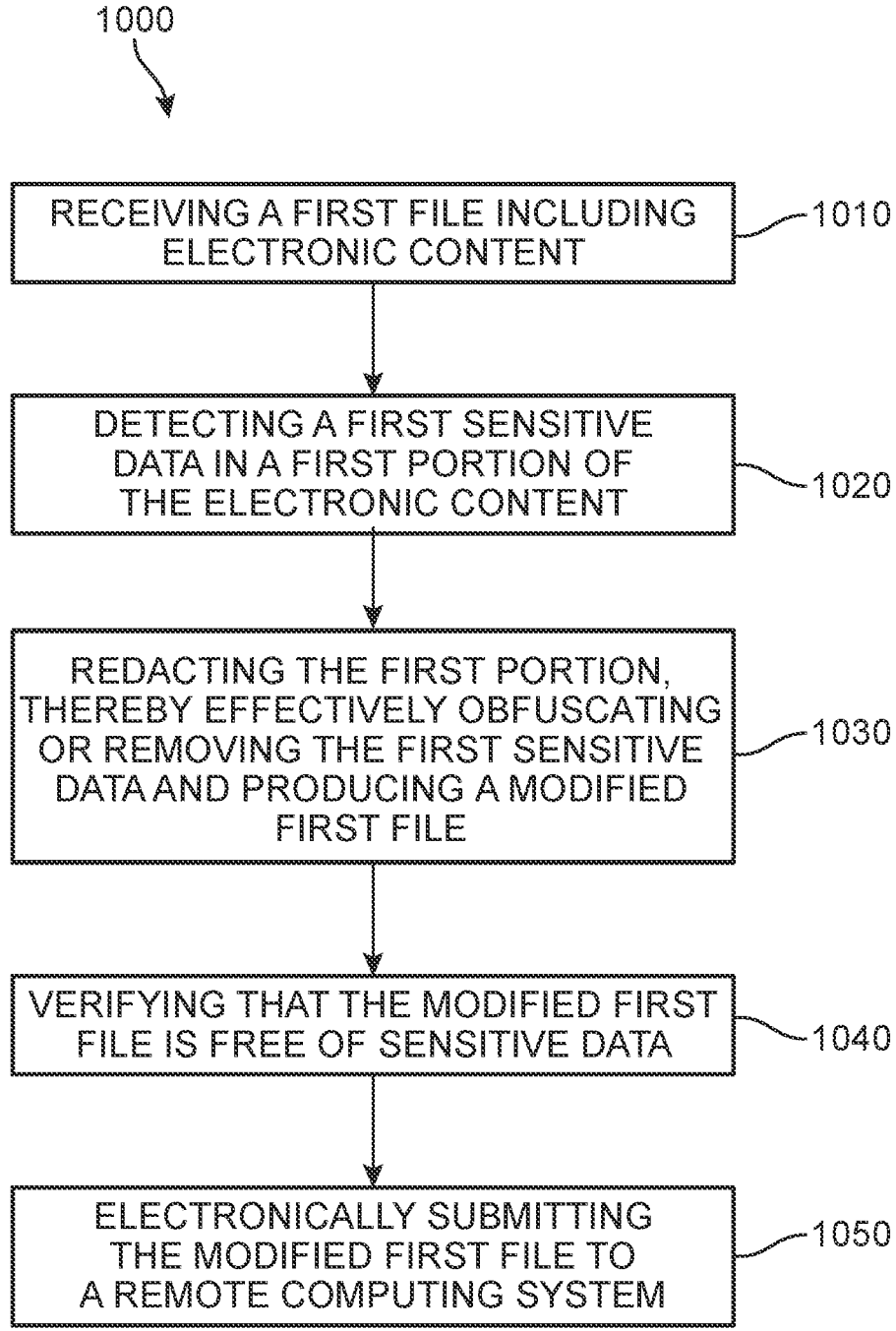
FIG. 10 is a flow diagram of a process for protecting sensitive information, according to an embodiment.

FIG. 10 is a flow chart illustrating an embodiment of a method 1000 of protecting sensitive information. The method 1000 includes a first step 1010 of receiving, at a document submission application, a first file including electronic content, and a second step 1020 of detecting, at the document submission application, a first sensitive data in a first portion of the electronic content. In addition, the method 1000 includes a third step 1030 of automatically redacting (in response to detecting), at the document submission application, the first portion, thereby effectively obfuscating or removing the first sensitive data and producing a modified first file, as well as a fourth step 1040 of verifying, at the document submission application, that the modified first file is (now) free of sensitive data. It should be understood that only the fourth portion is to be redacted (corresponding to the sensitive data), while the remaining information (non-sensitive) is unaffected. Furthermore, the method 1000 includes a fifth step 1050 of electronically submitting, via the document submission application and in response to the verification, the modified first file to a remote computing system (e.g., over a network to a cloud-based repository).

In other embodiments, the method may include additional steps or aspects. In cases where the electronic content includes audio data, the step of detecting the first sensitive data can also include steps of transcribing, using natural language processing techniques, the audio data to text, determining, via the document submission application, a first text segment of the transcribed text has a high likelihood of including personally identifiable information (PII), and classifying a first audio segment corresponding to the first text segment as the first sensitive data. In some embodiments, redacting the first portion involves replacing the first audio segment with one of white noise, silence, and a non-verbal sound.

In cases where the electronic content includes text, the step of detecting the first sensitive data can further include determining, using a natural lingual processing (NLP) model, a first segment of the text has a high likelihood of including personally identifiable information (PII), and classifying the first segment as the first sensitive data. In some examples redaction of the first portion involves encrypting, masking, or tokenizing the first segment. For example, rather than simply block the information, the information may be securely encrypted, masked, or replaced with a token. In addition, where the electronic content includes image data, the step of detecting the first sensitive data can involve determining, using an object recognition model, a first object in the image data has a high likelihood of representing a child, and classifying the first object as the first sensitive data. In some examples, redaction of the first portion involves blurring or pixelating the first object, and in another example, redaction of the first portion involves blanking the first object. In different embodiments, the document submission application is associated with a first service provider, and the detection of sensitive data is based on a set of business rules identifying types of personally identifiable information (PII) that are unacceptable for storage in the remote computing system. In one embodiment, the method also includes deleting, at the document submission application, the first file after the redacted first file is submitted.

Other methods can also be contemplated within the scope of this disclosure. For example, a method of protecting sensitive information in video data includes a first step of receiving, at a document submission application, a first video file including a sequence of frames, a second step of detecting, at the document submission application, a first sensitive data in a first frame of the first video file, a third step of automatically redacting, at the document submission application, the first sensitive data, thereby effectively obfuscating or removing the first sensitive data from the first video file, and a fourth step of electronically submitting, via the document submission application, the redacted first video file to a remote computing system.

In different embodiments, this method may include additional steps or aspects. In one embodiment, the first frame occurs immediately after a second frame and immediately before a third frame, and the step of automatically redacting the first sensitive data further includes removing the first frame, and stitching (using video frame stitching techniques) the second frame to the third frame. In some embodiments, the step of automatically redacting the first sensitive data further includes segmenting the first frame into a foreground and a background, and obscuring only the background. For purposes of this application, obscuring includes the use of techniques such as blurring, pixelating, and blanking (replacing or overlaying the sensitive data with a 'blank' virtual object such as a circle or square), or other methods of concealing, masking, or otherwise removing the presence of the sensitive data. In another embodiment, where the first frame occurs immediately before a second frame, and the second frame occurs immediately before a third frame, the step of automatically redacting the first sensitive data can further include steps of detecting, at the document submission application, the first sensitive data in the second frame of the first video file, segmenting each of the plurality of frames into a foreground and a background, and obscuring the background in only the first frame and the second frame or only in the second frame, and then returning to normal background in the third frame where the first sensitive data was not detected.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electro-magnetic waves propagating through a waveguide or other transmission media (e.g., light pulses passing through a fiber-optic cable), or electrical signals transmitted through a wire.

Instructions stored on the non-transitory computer read-able medium for carrying out operations of the present invention may be instruction-set-architecture (ISA) instruc-tions, assembler instructions, machine instructions, machine dependent instructions, microcode, firmware instructions, configuration data for integrated circuitry, state-setting data, or source code or object code written in any of one or more programming languages, including an object oriented pro-gramming language such as Smalltalk, C++, or suitable language, and procedural programming languages, such as the "C" programming language or similar programming languages.

Aspects of the present disclosure are described in asso-ciation with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, function-ality, and operation of possible implementations of various disclosed embodiments. Accordingly, each block in the flowchart or block diagrams may represent a module, seg-ment, or portion of instructions. In some implementations, the functions set forth in the figures and claims may occur in an alternative order than listed and/or illustrated.

The embodiments may utilize any kind of network for communication between separate computing systems. A network can comprise any combination of local area net-works (LANs) and/or wide area networks (WANs), using both wired and wireless communication systems. A network may use various known communications technologies and/or protocols. Communication technologies can include, but are not limited to: Ethernet, 802.11, worldwide interoper-ability for microwave access (WiMAX), mobile broadband (such as CDMA, and LTE), digital subscriber line (DSL), cable internet access, satellite broadband, wireless ISP, fiber optic internet, as well as other wired and wireless technolo-gies. Networking protocols used on a network may include transmission control protocol/Internet protocol (TCP/IP), multiprotocol label switching (MPLS), User Datagram Pro-tocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conven-tional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implemen-tations are possible that are within the scope of the inven-tion. Accordingly, the invention is not to be restricted except in light of the attached claims and their equivalents. Also, various modifications and changes may be made within the scope of the attached claims.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combi-nation. Accordingly, the embodiments are not to be restricted except in light of the attached claims and their equivalents. Also, various modifications and changes may be made within the scope of the attached claims.

We claim:

1. A computer-implemented method of protecting sensi-tive information, the method comprising:

receiving, at a document submission application, a file including image data captured from a camera;

detecting, at the document submission application, sensi-tive data in the image data corresponding to an object in the image data;

generating, on a display for a user, a message indicating that the sensitive data has been detected in the image data and providing, on the display, a set of options for the user to select, wherein the set of options includes a first option for recapturing new image data after remov-ing the object from view of the camera and a second option for automatically redacting, by the document submission application, the object from the image data;

automatically redacting, at the document submission application and in response to receiving a user selection of the second option, the object to remove the object from the image data, thereby effectively obfuscating or removing the sensitive data and producing a modified file;

verifying, at the document submission application, that the modified file is free of sensitive data; and electronically submitting, via the document submission application and in response to the verification, the modified file to a remote computing system.

2. The method of claim 1, wherein the file includes audio data, and the method further includes:

transcribing, using natural language processing tech-niques, the audio data to text;

determining, via the document submission application, a text segment of the transcribed text includes personally identifiable information (PII); and classifying an audio segment corresponding to the text segment as additional sensitive data.

3. The method of claim 2, wherein the method further includes replacing the audio segment with one of white noise, silence, and a non-verbal sound.

4. The method of claim 1, wherein the file includes text, and method further includes:

determining, using a natural language processing model, a segment of the text includes personally identifiable information (PII); and classifying the segment of the text as additional sensitive data.

5. The method of claim 4, wherein redaction of the object involves one of encrypting, masking, and tokenizing the segment of the text.

6. The method of claim 1, wherein the file comprises a video.

7. The method of claim 1, wherein redaction of the object involves blurring or pixelating the object.

8. The method of claim 1, wherein redaction of the object involves blanking the first object.

9. The method of claim 1, wherein the document submission application is associated with a first service provider, and the detection of sensitive data is based on a set of rules identifying types of personally identifiable information (PII) that are unacceptable for storage in the remote computing system.

10. A system for protecting sensitive information, the system comprising a processor and machine-readable media including instructions which, when executed by the processor, cause the processor to:

receive, at a document submission application, a file including captured image data from a camera;

detect, at the document submission application, sensitive data in the captured image data corresponding to an object in the captured image data;

generate, on a display for a user, a message indicating that the sensitive data has been detected in the image data and provide, on the display, a set of options for the user to select, wherein the set of options includes a first option for recapturing new image data after removing the object from view of the camera and a second option for automatically redacting, by the document submission application, the object from the image data;

automatically redact, at the document submission application and in response to receiving a user selection of the second option, the object from the captured image data, thereby effectively obfuscating or removing the sensitive data and producing a modified first file;

verify, at the document submission application, that the modified file is free of sensitive data; and electronically submit, via the document submission application and in response to the verification, the modified file to a remote computing system.

11. The system of claim 10, wherein the file includes audio data, and the instructions further cause the processor to:

transcribe, using natural language processing techniques, the audio data to text;

determine, via the document submission application, a text segment of the transcribed text includes personally identifiable information (PII); and classify an audio segment corresponding to the text segment as additional sensitive data.

12. The system of claim 11, wherein the instructions further cause the processor to replace the audio segment with one of white noise, silence, and a non-verbal sound.

13. The system of claim 10, wherein the file comprises a video.

14. The system of claim 13, wherein redaction of the object involves blurring or pixelating the object.

15. The system of claim 13, wherein redaction of the object involves blanking the object.

16. The system of claim 10, wherein the document submission application is associated with a first service provider, and the detection of sensitive data is based on a set of rules identifying types of personally identifiable information (PII) that are unacceptable for storage in the remote computing system.

17. The system of claim 10, wherein the file includes text, and the instructions further cause the processor to:

determine, using a natural language processing model, a segment of the text includes personally identifiable information (PII); and classify the segment of the text as additional sensitive data; and redact the segment of the text.

18. The system of claim 17, wherein the PII is a door code or other entry security credential.

19. The system of claim 17, wherein the PII is a blood type.

20. The system of claim 17, wherein redaction of the segment of the text involves one of encrypting, masking, and tokenizing the segment of the text.

* * * * *